United States Patent
Gozzi

(10) Patent No.: US 7,316,793 B2
(45) Date of Patent: Jan. 8, 2008

(54) FORMULATION OF A LIQUID COMPOSITION TO FORM AN ELECTRICAL INSULATOR, AN ANTIOXIDANT OR A DEGREASER

(76) Inventor: Fabio Gozzi, Rua Serra do Japi, 1526, 11°. andar, São Paulo / SP (BR)

( * ) Notice: Subject to any disclaimer, the term of this patent is extended or adjusted under 35 U.S.C. 154(b) by 1420 days.

(21) Appl. No.: 09/788,614

(22) Filed: Feb. 21, 2001

(65) Prior Publication Data

US 2006/0278852 A1    Dec. 14, 2006

(51) Int. Cl.
- H01B 3/24  (2006.01)
- B01F 1/00  (2006.01)
- C23G 5/028 (2006.01)
- C11D 7/24  (2006.01)
- C11D 7/30  (2006.01)

(52) U.S. Cl. .................. 252/580; 252/570; 252/578; 252/579; 252/364; 252/407; 510/175; 510/185; 510/407; 510/412; 106/14.22; 106/14.26; 106/14.27; 106/14.28

(58) Field of Classification Search ............... 252/580
See application file for complete search history.

(56) References Cited

U.S. PATENT DOCUMENTS

| | | | | |
|---|---|---|---|---|
| 3,046,160 A | * | 7/1962 | Dengler | 428/447 |
| 3,904,732 A | * | 9/1975 | Wick et al. | 264/341 |
| 4,187,191 A | * | 2/1980 | Simpson, Jr. | 510/176 |
| 4,293,433 A | * | 10/1981 | Borror et al. | 336/94 |
| 4,415,629 A | * | 11/1983 | Palumbo et al. | 428/375 |
| 4,697,043 A | * | 9/1987 | Rowe, Jr. | 174/17 LF |
| 4,745,966 A | * | 5/1988 | Avery | 165/104.33 |
| 4,790,337 A | * | 12/1988 | Fowler | 134/109 |
| 4,995,982 A | * | 2/1991 | Barthorpe | 210/634 |
| 5,610,132 A | * | 3/1997 | Momoda et al. | 510/506 |

FOREIGN PATENT DOCUMENTS

EP    0 767 236 A1 * 9/1997

* cited by examiner

*Primary Examiner*—Joseph D. Anthony
(74) *Attorney, Agent, or Firm*—TraskBritt, P.C.

(57) ABSTRACT

Formulation of a liquid composition to form an electrical insulator, an antioxidant or a degreaser, obtained from the combination of by-products with mineral origin, whose formulation shall vary to meet different characteristics, becoming an electrical insulator, an antioxidant or a degreaser, ideal for different applications, the basic formula comprising: tetrachloroethylene, Mineral oil, methyl cellulose carboxy and 5 to 7% dipropylene glycol.

3 Claims, No Drawings

FORMULATION OF A LIQUID COMPOSITION TO FORM AN ELECTRICAL INSULATOR, AN ANTIOXIDANT OR A DEGREASER

BACKGROUND OF THE INVENTION

1. Field of the Invention

The present invention relates to a product obtained from the combination of by-products with mineral origin, whose formulation shall vary to meet different characteristics, becoming an electrical insulator, an antioxidant or a degreaser, ideal for different applications, such as: electrical insulating protection, circuits and electroelectronic equipment waterproofer; antioxidant and anticorrosive protection of ferrous and non-ferrous materials; protection of surfaces exposed to bad weather conditions (rain, humidity, heat, high salinity degree of the environment, etc.); and degreaser for several products.

2. State of the Art

There are nowadays several products intended for electrical insulation against humidity, such as: the varnishes and the acrylic resins. These two kinds are the most used ones nowadays as electrical insulators.

BRIEF SUMMARY OF THE INVENTION

The varnishes, as is well known, after being applied, form a substantially rigid film, enough to provide correct electrical insulation; however, it is affected by some application restrictions and by some inconveniences. When applied to products which, for any reason, are heated, such as to electrical and electronic circuits, the thin varnish layer ends up suffering cracks or ungluing from the surface to be isolated, due to the low resistance to heat, making the insulation vulnerable or unreliable. These same varnishes cannot be applied to the surfaces of the circuits posts, switches, contactors, and all the electrical actuation devices of the "on/off" type, because they prevent the perfect transmission of the electrical current, obviously due to its rigid insulator characteristic.

On the other hand, the acrylic resins, widely used as electrical insulators for the application to printed circuits panels of electroelectronic equipment, even with a higher resistance to heat, are fragile to mechanical reactions, breaking easily, losing thus their insulating capacity. Besides, once they are applied to printed panels, the acrylic resins prevent any component from being replaced isolately, because they are difficult to be removed, causing the complete loss of these panels.

OBJECTIVES OF THE INVENTION

The formulation of a liquid composition to form an electrical insulator and antioxidant, which, by varying its formula, can also have the function of degreaser, characterizing an advantageous product in the application.

The referred insulator, when applied, incorporates to the surface of the materials, no matter their physical constitution, such as: copper, bronze, aluminum, iron, etc.; keeping its original characteristics, isolating them electrically, and waterproofing them against humidity.

It is important to emphasize that the application of the present product to switches, contactors, and all the electrical actuation devices of the "on/off" type, does not prevent them from working perfectly, due to their low viscosity liquid form.

Another objective of the invention is the characterization of a product which, once applied, mainly to electrical circuits and printed circuits panels, promotes the electrical insulation, as well as contributes for eliminating "bad contact".

Another objective of the invention is the characterization of a high penetrability insulator, thanks to its liquid and low viscosity form, what permits great fluidity among the components, resulting in a more homogeneous cover all over the surface applied, no matter the physical characteristics of this surface. As a result of the high penetration of the present insulator, a perfect electrical insulation against humidity is obtained. Its liquid form ensures the best performance in the presence of mechanical reactions, together with the high resistance to big temperature variations, producing better results when compared to the products with the same purpose.

The referred product, as aforesaid, is an electrical insulator and antioxidant in the liquid form, having special characteristics which make it a high performance replacer in relation to others, which demand a big space to accommodate their volumes and have restrictions concerning the application, when used for the same purpose. The comparative table below shows the high insulation power (dielectric constant) of the referred product in relation to some materials used with the same purpose.

| PRODUCT/MATERIAL | DIELECTRIC CONSTANT AT 25° C. |
|---|---|
| Poly(tetrafluoro-ethylen) [Teflon ®] | 2,1 |
| Oil for Transformers | 2,2 |
| Polyethylen | 2,2 |
| Invention | 2,5 |

The present invention, FORMULATION OF A LIQUID COMPOSITION TO FORM AN ELECTRICAL INSULATOR, AN ANTIOXIDANT OR A DEGREASER, presents a first basic formula characterized in that it comprises, to produce 1 liter:

| COMPONENTS | QUANTITY (%) | VOLUME (milliliters) |
|---|---|---|
| Tetrachlorethylene | 60-80 | 600-800 |
| Mineral Oil* | 10-30 | 100-300 |
| High Viscosity Methyl Cellulose Carboxy | 3-5 | 30-50 |
| Dipropylene glycol | 5-7 | 50-70 |

*The present Mineral Oil in the formulation can be any Mineral Oil that fits in the following classification: SAE15W/40API-CF4/CF, where:

(i) The SAE (Society of Automotive Engineers) classification indicates the oil viscosity for viscosity bands: one in a low temperature (15 W) and another one at a high temperature (40).

(ii) The API (American Petrolem Institute) classifications define the suitability of the oil for various kinds of motors, such as gasoline or diesel, with or without a turbo, etc.; where CF4—For engines of four times and high rotation;

CF—For engines of vehicles 4×4 (off-road) with indirect injection and other diesel engines, including those using cpmbustible with more than 0.5% of sulphur.

This formulation permits the use of the product as an electrical insulator in several applications, such as: insulating electrical protection, circuits and electroelectronic equipment waterproofing; antioxidant and anticorrosive protection of ferrous and non-ferrous metals, protection of surfaces exposed to bad weather conditions (rain, humidity, heat, high salinity degree of the environment, etc.).

The same basic formulation, with a variation in the concentration of some components, permits the same product have the additional function of antioxidant, and, for that to happen, it is characterized in that it comprises, to produce 1 liter:

| COMPONENTS | QUANTITY (%) | VOLUME (milliliters) |
|---|---|---|
| Tetrachlorethylene | 40-60 | 400-600 |
| Mineral Oil* | 30-50 | 300-500 |
| High Viscosity Methyl Cellulose Carboxy | 3-5 | 30-50 |
| Dipropylene glycol | 5-7 | 50-70 |

*The present Mineral Oil in the formulation can be any Mineral Oil that fits in the following classification: SAE15W/40API-CF4/CF.

Finally, the same basic formulation with variation in the concentration of some components, permits the same product have the additional function of degreaser, and for that to happen, it is characterized in that it comprises, to produce 1 liter:

| COMPONENTS | QUANTITY (%) | VOLUME (milliliters) |
|---|---|---|
| Tetrachlorethylene | 70-90 | 700-900 |
| Mineral Oil* | 5-20 | 50-200 |
| High Viscosity Methyl Cellulose Carboxy | 3-5 | 30-50 |
| Dipropylene glycol | 5-7 | 50-70 |

*The present Mineral Oil in the formulation can be any Mineral Oil that fits in the following classification: SAE15W/40API-CF4/CF.

PRODUCT CHARACTERISTICS: electrical insulator and liquid antioxidant (liquid insulator for electrical and electronic equipment protection).

PURPOSE OF APPLICATION: electrical insulating protection, circuits and electroelectronic equipment waterproofer, antioxidant and anticorrosive protection of ferrous and non-ferrous materials, and protection of surfaces exposed to bad weather conditions (rain, humidity, heat, high salinity degree of the environment, etc.).

USAGE: in machines, electroelectronic equipment, mechanical equipment, induction engines, primary cabins, electrical panels, transformers washing, electrical and electronic components, assembled or not, as well as other kinds of metallic parts, either finished or as raw material.

FORMS OF APPLICATION: it can be applied by spraying, immersion or brushing. When applied by immersion, it can be recovered by any filtering process able to retain the residues acquired in the application.

Only for illustration purposes, some practical experiences performed with the referred product in its different formulations are described below.

1st Experience—Ferrous Material Metallic Plates

Steel plates stored out in the weather, with no effective protection against corrosion, showed rust points after some time, which demanded a great effort to be eliminated before their printing and painting. The referred product has been applied, by spraying, to about 2,500.00 $m^2$ plates, and they were kept exposed to bad weather conditions. After 120 days from the product application, the metallic plates protection has proved to be successful, for they did not show rust, as well as the easy demolding of the printed components with them resulted. These printed pieces have been followed up throughout the painting process, showing excellent results, once the product, besides not contaminating the paint applied, also facilitated its fixation to the plate.

2nd Experience—Electroelectronic Equipment.

The product has been applied to telephone lines distribution boxes, and several parallel tests have also been made, with the purpose of proving the product insulation and waterproofing efficacy, once said distribution boxes are exposed to had weather conditions, suffering a lot of interference due to humidity. The results were satisfactory, and there was even a suggestion to make the product official as a standardized item for the telephony area.

3rd Experience—Electronic Device.

A mobile phone device, after being immersed into water, received the referred product and started operating normally.

4th Experience—Telephone Central Flood

After a big flood, a company had its telephone central submerged into water and mud, and it stopped working instantly. In this condition, the immediate solution would be the replacement of the whole equipment. As an attempt to recover it, though, it has been washed with current water and then the referred product has been applied. After that, the whole equipment was completely recovered and kept working with no problems.

5th Experience—Machine Having Electrical and Mechanical Parts.

A car engine received a considerable quantity of water. With the application of the referred product, though, it worked normally. Therefore, in this area, as is well known, there are many kinds of engines, some with electrical ignition inclusive, and other older ones, which use contact points (contacts), and, in such cases, the presence of humidity is fatal to prevent them from working. However, with the application of the referred product, the engines testes worked perfectly.

The invention claimed is:

1. Formulation of a Liquid Composition to Form an Electrical Insulator, wherein the basic formulation to form an electric insulator comprises:
    60 to 80% by volume of tetrachloroethylene;
    10 to 30% by volume of Mineral oil;
    3 to 5% by volume of high viscosity methyl cellulose carboxy; and
    5 to 7% by volume of dipropylene glycol.

2. Formulation of Liquid Composition to Form an Antioxidant, wherein the basic formulation to form an antioxidant comprises:
    40 to 60% by volume of tetrachloroethylene;
    30 to 50% by volume of Mineral oil;
    3 to 5% by volume of high viscosity methyl cellulose carboxy; and
    5 to 7% by volume of dipropylene glycol.

3. Formulation of a Liquid Composition to Form a Degreaser, wherein the basic formulation to form a degreaser comprises:
- 70 to 90% by volume of tetrachloroethylene;
- 5 to 20% by volume of Mineral oil;
- 3 to 5% by volume of high viscosity methyl cellulose carboxy; and
- 5 to 7% by volume of dipropylene glycol.

* * * * *